US011229964B2

(12) United States Patent
Weixler (10) Patent No.: US 11,229,964 B2
(45) Date of Patent: Jan. 25, 2022

(54) APPARATUS FOR CHAMFER-MACHINING A WORKPIECE

(71) Applicant: Liebherr-Verzahntechnik GmbH, Kempten (DE)

(72) Inventor: Johannes Weixler, Durach (DE)

(73) Assignee: Liebherr-Verzahntechnik GmbH, Kempten (DE)

( * ) Notice: Subject to any disclaimer, the term of this patent is extended or adjusted under 35 U.S.C. 154(b) by 2 days.

(21) Appl. No.: 16/380,572

(22) Filed: Apr. 10, 2019

(65) Prior Publication Data
US 2019/0314910 A1    Oct. 17, 2019

(30) Foreign Application Priority Data

Apr. 11, 2018  (DE) ..................... 10 2018 108 622.9

(51) Int. Cl.
*B23F 19/10*     (2006.01)
*B23F 23/00*     (2006.01)
*B23P 15/14*     (2006.01)
*B23F 17/00*     (2006.01)

(52) U.S. Cl.
CPC .......... *B23F 19/102* (2013.01); *B23F 23/006* (2013.01); *B23P 15/14* (2013.01); *B23F 17/006* (2013.01); *Y10T 29/49476* (2015.01)

(58) Field of Classification Search
CPC ... B23C 3/305; B23C 3/32; B23F 1/06; B23F 5/205; B23F 19/10; B23F 19/102; B23F 19/105; B23F 19/107; B23F 23/006; B23P 15/14; Y10T 29/49476
See application file for complete search history.

(56) References Cited

U.S. PATENT DOCUMENTS 3,426,485 A    2/1969  Yamaoka
9,346,112 B2   5/2016  Fleischer et al.
(Continued)

FOREIGN PATENT DOCUMENTS

DE       929224 C     6/1955
DE      8328237 U1    7/1984
(Continued)

OTHER PUBLICATIONS

Japanese Patent Office, Office Action Issued in Application No. 2019-070346, dated Sep. 23, 2020, 23 pages.

*Primary Examiner* — Christopher J Besler
(74) *Attorney, Agent, or Firm* — McCoy Russell LLP (57) ABSTRACT

The present application relates an apparatus for chamfer-machining at least two edges of a toothed workpiece, wherein the apparatus comprises at least one workpiece spindle with a rotatably mounted workpiece holder for receiving the workpiece and a machining head movable relative to the workpiece holder via at least one axis of movement, wherein on the machining head at least one first tool spindle with a first rotatably mounted tool holder is provided for receiving at least one first chamfer milling cutter for chamfer-machining a first edge of a toothing of a workpiece received in the workpiece holder, wherein on the machining head a second tool spindle with a second rotatably mounted tool holder is provided for receiving an end milling cutter for chamfer-machining a second edge of a toothing of a workpiece received in the workpiece holder.

19 Claims, 8 Drawing Sheets

(56) References Cited

U.S. PATENT DOCUMENTS

| | | | |
|---|---|---|---|
| 2005/0260050 A1* | 11/2005 | Ribbeck | ................ B23Q 1/621 409/39 |
| 2016/0089737 A1 | 3/2016 | Zeller | |
| 2017/0173713 A1* | 6/2017 | Thijssen | ................ B23F 5/163 |

FOREIGN PATENT DOCUMENTS

| | | | | |
|---|---|---|---|---|
| DE | 19701267 A1 | 7/1998 | | |
| DE | 10113653 A1 | 9/2002 | | |
| DE | 20320294 U1 | 4/2004 | | |
| DE | 10330474 A1 | 2/2005 | | |
| DE | 202007016740 U1 | 4/2008 | | |
| DE | 102013003804 A1 | 9/2014 | | |
| DE | 102013015240 A1 | 10/2014 | | |
| DE | 102014218082 A1 * | 3/2016 | .............. B23F 5/163 | |
| DE | 102014014132 A1 | 5/2016 | | |
| EP | 2514546 A1 | 10/2012 | | |
| EP | 2705919 A2 | 3/2014 | | |
| EP | 3012056 A1 | 4/2016 | | |
| EP | 3013505 B1 | 8/2017 | | |
| EP | 2694239 B1 | 2/2018 | | |
| JP | S5531571 A | 3/1980 | | |
| JP | S62050016 U | 3/1987 | | |
| JP | S62144118 U | 6/1987 | | |
| JP | 2006224228 A | 8/2006 | | |
| JP | 2017530016 A | 10/2017 | | |
| WO | 2014206902 A1 | 12/2014 | | |

* cited by examiner

APPARATUS FOR CHAMFER-MACHINING A WORKPIECE

CROSS REFERENCE TO RELATED APPLICATIONS

The present application claims priority German Application No. 10 2018 108 622.9 entitled "APPARATUS FOR CHAMFER-MACHINING A WORKPIECE,' filed Apr. 11, 2018. The entire contents of the above-listed application are hereby incorporated by reference for all purposes.

TECHNICAL FIELD

The present disclosure relates to an apparatus for chamfering at least two edges of a toothed workpiece.

BACKGROUND AND SUMMARY

When machining workpieces to produce a toothing on the workpiece blank, sharp-edged material protrusions are obtained on the machined workpiece edges. These protrusions, referred to as burs, must be removed by deburring the edges of the toothing, as they may interfere with other machining that may follow or represent a risk of injury for the machine operator in the manual handling of parts. In addition, the edges of the toothing frequently may also be provided with special protective chamfers.

Chamfering the workpieces is usually performed by specially adapted chamfering tools after production of the toothing on the workpiece blank. For this chamfering process a plurality of methods are available in the prior art. In series production, the methods of press deburring according to DE 8328237 A and of chamfer milling deburring according to DE 20320294 A as well as DE 202007016740 A are used almost frequently.

DE 20320294 A shows the chamfer milling deburring with a so-called Chamfer Cut unit. Such a Chamfer Cut unit is a disk-shaped chamfering tool that includes cutting teeth and flutes on its circumference, preferably each with the same circumferential spacing. The cutting teeth extend helically in a circumferential direction. The Chamfer Cut unit is multi-threaded, wherein one tooth is provided per thread. The cutting edges formed on the front side of the teeth in the direction of rotation, however, are located on a common flight circle.

The above-mentioned chamfering methods usually are employed for chamfering workpieces with an external toothing, for example the chamfering tool is clamped on the same tool mandrel together with the milling cutter and after the milling operation is brought into engagement with the edges of the toothing. From DE 10 2013 015 240 A1 it is furthermore known to employ a chamfer milling station in which the only tools employed in the tool spindle are chamfer milling cutters, in particular Chamfer Cut units.

However, in the chamfer milling operation by means of chamfer milling cutters, in particular by means of a Chamfer Cut method, there is the problem that no interfering edges may be present in the vicinity of the tooth edge to be machined, as a significant part of the flight circle of the milling cutter teeth extends above or below the front side of the toothing and within the root circle of the toothing whose edge is to be chamfered. Therefore, in the case of multiple toothings or toothed shafts, the Chamfer Cut method often cannot be used for all tooth edges.

In such cases it has therefore only been possible to debur tooth edges blocked by disturbing contours by means of press deburring. In this method, however, the material is pressed into the tooth flank leading to a high degree of wear of the tool in the region of the tooth edges, especially in honing operations.

It is the object of the present disclosure to provide an improved apparatus for chamfer-machining at least two edges of a toothed workpiece.

The present disclosure comprises an apparatus for chamfer-machining at least two edges of a toothed workpiece, wherein the apparatus comprises at least one workpiece spindle with a rotatably mounted workpiece holder for receiving the workpiece and a machining head movable relative to the workpiece holder via at least one axis of movement, wherein on the machining head at least one first tool spindle with a first rotatably mounted tool holder is provided for receiving at least one first chamfer milling cutter for chamfer-machining a first edge of a toothing of a workpiece received in the workpiece holder. The present disclosure is characterized in that on the machining head a second tool spindle with a second rotatably mounted tool holder is provided for receiving an end milling cutter for chamfer-machining a second edge of a toothing of the workpiece received in the workpiece holder.

According to the present disclosure, those edges that cannot be machined by the first chamfer milling cutter therefore can be machined by means of the end milling cutter. The remaining edges, in which there are no disturbing contours, then are machined by means of the at least one first chamfer milling cutter. Machining by means of the end milling cutter is more time-consuming than machining by means of the chamfer milling cutter, but for the first time provides for machining edges that are more difficult to machine due to disturbing contours, and now with the required quality. Due to the arrangement of the second tool spindle with the second tool holder for the end milling cutter on the machining head on which the first tool spindle with the first rotatably mounted tool holder for the first chamfer milling cutter also is arranged, the end milling cutter can be positioned relative to the tooth edge via the at least one axis of movement of the machining head and can be brought into engagement with the same.

In an embodiment of the present disclosure the workpiece holder and the first tool holder can be driven in a synchronized way for chamfering the first edge. Preferably, for producing the respective rotary movement of the workpiece holder and the first tool holder NC axes are used, whose rotary movement can be synchronized by a controller of the apparatus in order to carry out a chamfer milling operation of a first edge.

Preferably, the workpiece holder and the first tool holder may be driven by generating coupling. This allows a particularly effective chamfer milling operation.

In another embodiment of the present disclosure the first chamfer milling cutter may be a disk-shaped deburring tool that includes cutting teeth and flutes on its circumference. The cutting edges of the cutting teeth preferably are specifically adapted to the shape of the edge to be machined. For chamfer-milling different toothings, different first chamfer milling cutters correspondingly are required.

In some aspects, the at least one first chamfer milling cutter is a Chamfer Cut unit and/or a gear skiving tool. Such a Chamfer Cut unit may be a disk-shaped deburring tool that includes cutting teeth and flutes on its circumference. In some aspects, the cutting teeth and flutes on the circumference of the Chamfer Cut may each have the same circumferential spacing. The cutting teeth may extend helically in circumferential direction. The Chamfer Cut unit may be multi-threaded, wherein one tooth may be provided per thread. The cutting edges formed on the front side of the teeth in the direction of rotation, however, are located on a common flight circle.

In particular, the Chamfer Cut unit can be designed like the deburring tool described in DE 10330474 A1. Furthermore, chamfering of the first edge by means of the Chamfer Cut unit may be effected as it is described in DE 10330474 A1 for the deburring operation. Other than shown in DE 10330474 A1, however, the Chamfer Cut unit in accordance with the present disclosure preferably is not used with the tool that is used for producing the toothing, clamped on the same tool mandrel, but in a separate tool holder.

In some embodiments, the at least one axis of movement of the machining head is a Numerical Control (NC) axis, which for chamfer-machining the second edge can be actuated by a controller of the apparatus such that an end milling cutter received in the second tool holder is guided along the contour of the second edge to be machined, while the workpiece received in the workpiece holder rotates about its axis of rotation. The traversing movement of the at least one NC axis of the machining head therefore preferably may be repeated for each tooth of the toothing to be machined when chamfer-machining the second edge.

For example, in some aspects the at least one axis of movement, which is used for chamfer-machining the second edge, can be at least one first linear axis X, via which the machining head is traversable in a direction perpendicular to the axis of rotation of the workpiece holder and perpendicular to the axis of rotation of the first tool holder, and/or at least one second linear axis Z via which the machining head is traversable in a direction parallel to the axis of rotation of the workpiece holder.

Furthermore, the machining head may be pivotable about a pivot axis A that extends perpendicularly to the axis of rotation of the workpiece holder and perpendicularly to the axis of rotation of the first tool holder. In a first embodiment of the present disclosure, this pivot axis A is not actuated while chamfer-machining the second edge. In a second embodiment, however, the pivot axis A can be pivoted in a movement repeated for each tooth.

Furthermore, the machining head may be traversable via a third linear axis Y or V, which extends in a plane that is perpendicular to the first linear axis X.

The third linear axis Y or V can be used to traverse the machining head between a machining of two edges by different tools in order to bring the respective tool into engagement with the workpiece.

In one embodiment of the present disclosure the third linear axis Y or V on the other hand is not actuated while chamfer-machining at least one edge and in particular the second edge.

In another embodiment of the present disclosure a threading sensor is arranged on the machining head, which can be used both for threading the first chamfer milling cutter for chamfer-machining the first edge and for threading the end milling cutter for chamfer-machining the second edge. In some aspects, this is a contactless sensor. For example, an inductive sensor and/or an optical sensor can be used.

In a further embodiment of the present disclosure the second tool spindle may be arranged on the machining head via a pivot axis, via which it is pivotable from a first machining position for machining a lower edge into a second machining position for machining an upper edge.

In some aspects, the pivot axis is an adjustment axis. The use of an NC axis is not necessary here, as the axis is not traversed dynamically, but merely is pivoted into the correct machining position before the chamfer-machining operation in order to be aligned at an angle to the front side of the workpiece that corresponds to the desired angle of the chamfer.

In other aspects, however, adjustable stops are provided for adjusting the first and the second machining position so that the angle of the chamfer can be adjusted.

In further aspects, the pivot axis can be actuated via an actuator, in particular via a pneumatic cylinder. Alternatively, however, the pivot axis can also be actuatable only manually.

In an alternative embodiment the second tool spindle may also be rigidly arranged on the machining head. Pivoting of the second tool spindle from a first machining position for machining a lower edge into a second machining position for machining an upper edge can then be effected via the A-axis of the machining head.

In a further embodiment the axis of rotation of the second tool holder is aligned and/or can be aligned at an angle to a plane that extends perpendicularly to the axis of rotation of the workpiece holder, which angle lies in a range between +/−55°, preferably in a range between +/−45° and +/−30°. In particular, the axis of rotation of the second tool holder can be configured such that machining of an edge can be effected at an angle of the second tool holder to a plane that extends perpendicularly to the axis of rotation of the workpiece holder, in the amount of at least 30°. Preferably, the angle has a value in a range between 30° and 55°.

In yet another embodiment of the present disclosure the chamfer-machining operation is effected with an alignment of the second tool holder by which an end milling cutter received in the second tool holder extends from the tool holder through the tooth gap to the edge of the toothing that it machines. In this case, in some aspects the end milling cutter only extends with its tip over that end face of the workpiece whose edge with the toothing it machines. This allows machining of the edge also in the presence of disturbing contours.

In a possible embodiment the second tool spindle is rigidly arranged on the machining head or only via one or more adjustment axes. In some aspects, however, an adjusting arrangement for adjusting an angular position of the axis of rotation of the second tool holder relative to the machining head is provided for adjusting the chamfering angle.

Alternatively, the second tool spindle can be arranged on the machining head via at least one NC axis, in particular a pivot axis.

The axis of rotation of the second tool holder can be drivable pneumatically, hydraulically and/or electrically and preferably is drivable pneumatically.

In a possible embodiment a plurality of first chamfer milling cutters may jointly be received on a mandrel on the first tool holder, wherein the apparatus includes a controller by which a plurality of first edges may be chamfer-machined by the first chamfer milling cutters. In some aspects, the shape of the cutting teeth of the first chamfer milling cutters may be specifically adapted to the shape of the edges to be machined.

In one embodiment a brush can be received on a mandrel on the first tool holder together with the at least one first chamfer milling cutter, wherein the apparatus includes a controller by which an edge chamfer-machined by the first chamfer milling cutter or the end milling cutter can be deburred by the brush.

In some aspects, the machining head therefor is pivotable about a pivot axis A that extends perpendicularly to the axis of rotation of the workpiece holder and perpendicularly to the axis of rotation of the first tool holder. The axis of rotation of the first tool holder thereby can be aligned parallel to the axis of the workpiece holder for brush machining the second edge.

In one embodiment, the apparatus includes a controller that allows the production of a chamfer only in partial areas of the second edge. In particular, those areas of the edge in which not enough material is available for producing a chamfer can be omitted during the chamfer-machining operation.

Therefore, the end milling cutter can also be used in toothings of shafts in which the tooth base substantially corresponds to the radius of the shaft and therefore no tooth edge is present in this area. As the milling cutter is guided along the tooth edge under NC control, while the workpiece is rotated, for example only the tooth heads and the tooth flanks can be deburred here for example by omitting the tooth base.

In one embodiment the apparatus includes a controller that allows the machining of different partial areas of the second edge with different areas of the end milling cutter, for example with a shell area and a head area.

For example, the circumference of the end milling cutter may be employed in the region of the flanks and the head, whereas in the region of the tooth base a rounded head of the end milling cutter may be used so that a correspondingly narrower chamfer is obtained.

The present disclosure therefore also allows chamfer-machining of the toothing of a shaft.

Any form of milling cutters may be used. For example, the end milling cutter can be of cylindrical or conical design. The head can possibly be rounded. Furthermore, the use of an end milling cutter with a spherical head would also be conceivable.

In one embodiment of the present disclosure the apparatus is designed for the use of an end milling cutter with a cylindrical shell surface or a conical shell surface with a cone angle of less than 20°, preferably of less than 10°.

In another embodiment, the end milling cutter may have a rounded head.

In a further embodiment, the apparatus includes a controller for actuating the axes of the apparatus for automatically chamfering the edges of the toothing of the workpiece.

The controller of the apparatus preferably is programmed such that the apparatus according to the present disclosure automatically carries out the steps described above with regard to its mode of operation and/or application, and/or the methods yet described below.

The controller in particular includes a microprocessor and a memory in which a control program for actuating the apparatus is stored, which is executed by the microprocessor. The control methods and routines disclosed herein may be stored as executable instructions in non-transitory memory and may be carried out by the control system including the controller in combination with the various sensors, actuators, and other machining hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the control system/controller, where the described actions are carried out by executing the instructions in a system including the various machining components including actuators and sensors in combination with the electronic controller.

The apparatus disclosed herein and described above, is suitable for receiving a first chamfer milling cutter and in particular a Chamfer Cut unit in the first tool holder, for receiving an end milling cutter in the second tool holder, and for carrying out the applications described above. In particular, the apparatus includes a controller that provides for the use of such tools for chamfer-machining a first and a second edge.

The present disclosure, however, likewise comprises an apparatus as it is described above, in which at least one first chamfer milling cutter and in particular a Chamfer Cut unit is received in the first tool holder and an end milling cutter is received in the second tool holder.

In a first embodiment, the apparatus can be a stand-alone chamfering machine.

In a second embodiment the apparatus according to the present disclosure is a chamfering device integrated into a tooth-machining center.

The present disclosure furthermore relates to a tooth-machining center with an apparatus as it has been described above, a gear cutting machine and a workpiece changer. In some embodiments, the gear cutting machine is a gear shaping machine or a gear skiving machine or a gear hobbing machine. In other embodiments, the tooth-machining and the chamfering of the workpieces is effected in the tooth-machining center at parallel cycle times. In some aspects, workpieces toothed by the gear cutting machine are moved on via the workpiece changer to the apparatus according to the present disclosure for chamfering purposes, in order to be chamfered while the next workpiece is toothed already on the gear cutting machine. Chamfering of the workpiece also is conceivable between a roughing step and a finishing step, for which purpose the workpiece preferably is traversed from the gear cutting machine to the apparatus according to the present disclosure and back again.

In some aspects, the workpiece changer is a ring loader, wherein the chamfering apparatus according to the present disclosure and the gear cutting machine are arranged at different angular positions of the ring loader. The ring loader may be configured to transport workpieces along a circular transport path.

In some embodiments, the gear cutting machine and the apparatus according to the present disclosure include separate workpiece holders. The workpiece changer in this case moves a workpiece after the tooth-machining operation of the gear cutting machine from its workpiece holder to the workpiece holder of the apparatus according to the present disclosure for chamfering purposes.

In an alternative embodiment, the tooth-machining center can, however, also include a plurality of workpiece holders in which the workpieces remain for tooth-machining and chamfer-machining. In this case, the workpiece holders preferably are moved from the gear cutting machine to the apparatus according to the present disclosure and/or vice versa.

The workpiece changer preferably is used to load workpieces from an external transport path or other machining stations onto the workpiece holder or workpiece holders and remove them from the same.

According to another aspect of the present disclosure the apparatus can also be designed as a separate stand-alone machine. In some aspects, the same receives toothed workpieces from a transport path and/or automation in order to chamfer-machine the same. The correspondingly machined workpieces then are again handed over to a transport path and/or automation.

Independent of the previously illustrated apparatuses, the present disclosure also comprises a method for chamfer-machining at least two edges of a toothed workpiece, using an apparatus comprising at least one rotatably mounted workpiece holder for receiving the workpiece and a machining head movable relative to the workpiece holder via at least one axis of movement, wherein on the machining head at least one first rotatably mounted tool holder is provided, wherein a first edge of a toothing of a workpiece received in the workpiece holder is chamfer-machined via a chamfer milling cutter received in the first tool holder. According to the present disclosure, a second rotatably mounted tool holder is provided, wherein the chamfer-machining of a second edge of a toothing of the workpiece received in the workpiece holder is effected via an end milling cutter received in the second tool holder.

While other uses exist, the method according to the present disclosure and the apparatus according to the present disclosure may be used for chamfer-machining a workpiece with a multiple toothing.

In a possible embodiment of the present disclosure at least two edges of the plurality of toothings are chamfer-machined by one or more chamfer milling cutters received in the first tool holder and at least one edge of a toothing is chamfer-machined by the end milling cutter received in the second tool holder.

The method according to the present disclosure and the apparatus according to the present disclosure can be used both for chamfer-machining the edges of a workpiece with an external toothing and for chamfer-machining the edges of a workpiece with internal toothing and/or for machining an edge of an involute or non-involute contour with recurring structure.

BRIEF DESCRIPTION OF THE DRAWINGS

The present disclosure will now be illustrated in detail with reference to exemplary embodiments and drawings.

In the drawings.

DETAILED DESCRIPTION

Figure 1:
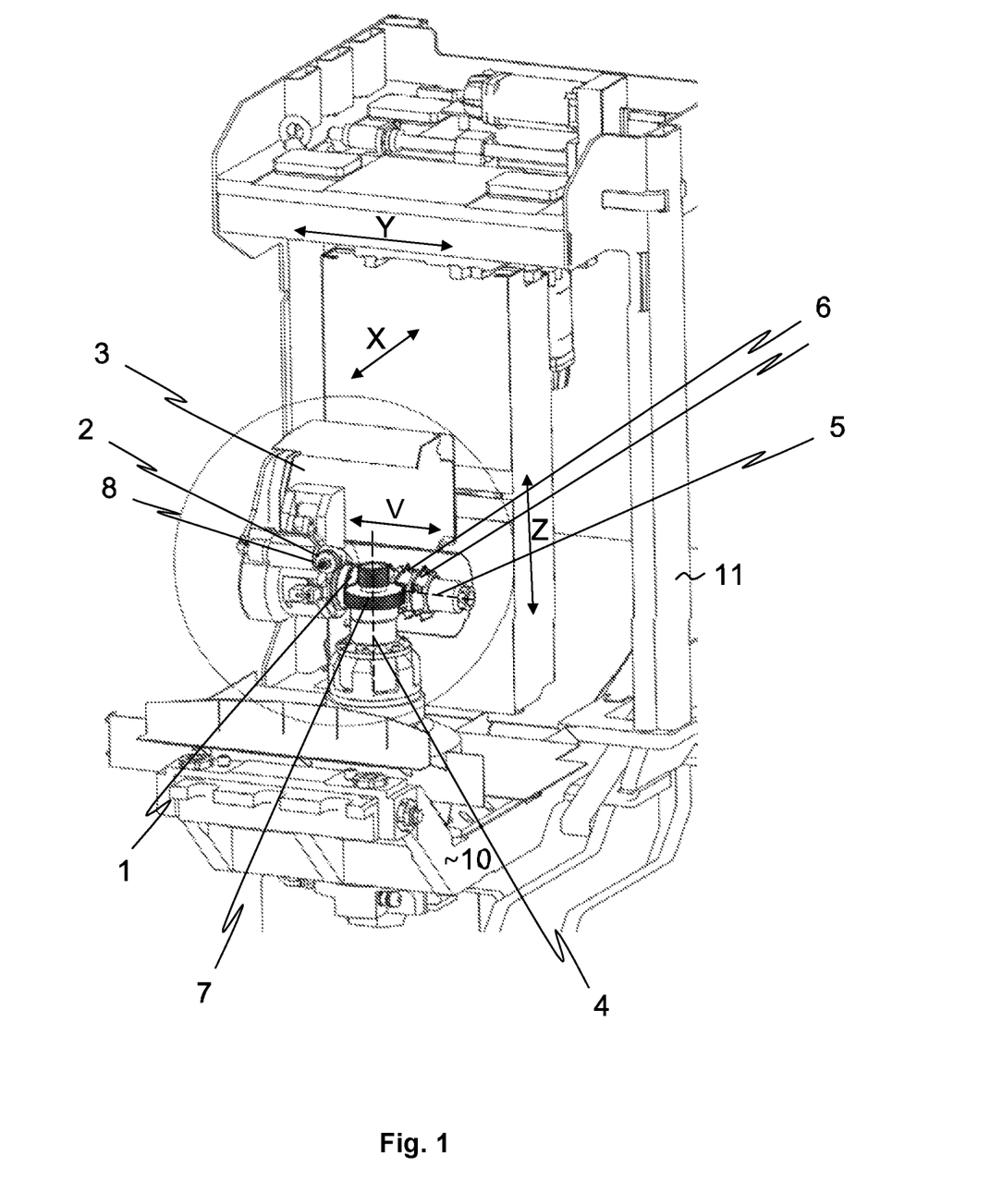
FIG. 1 shows a rendering of an exemplary embodiment of an apparatus according to the present disclosure for chamfer-machining a workpiece.
Figure 2:
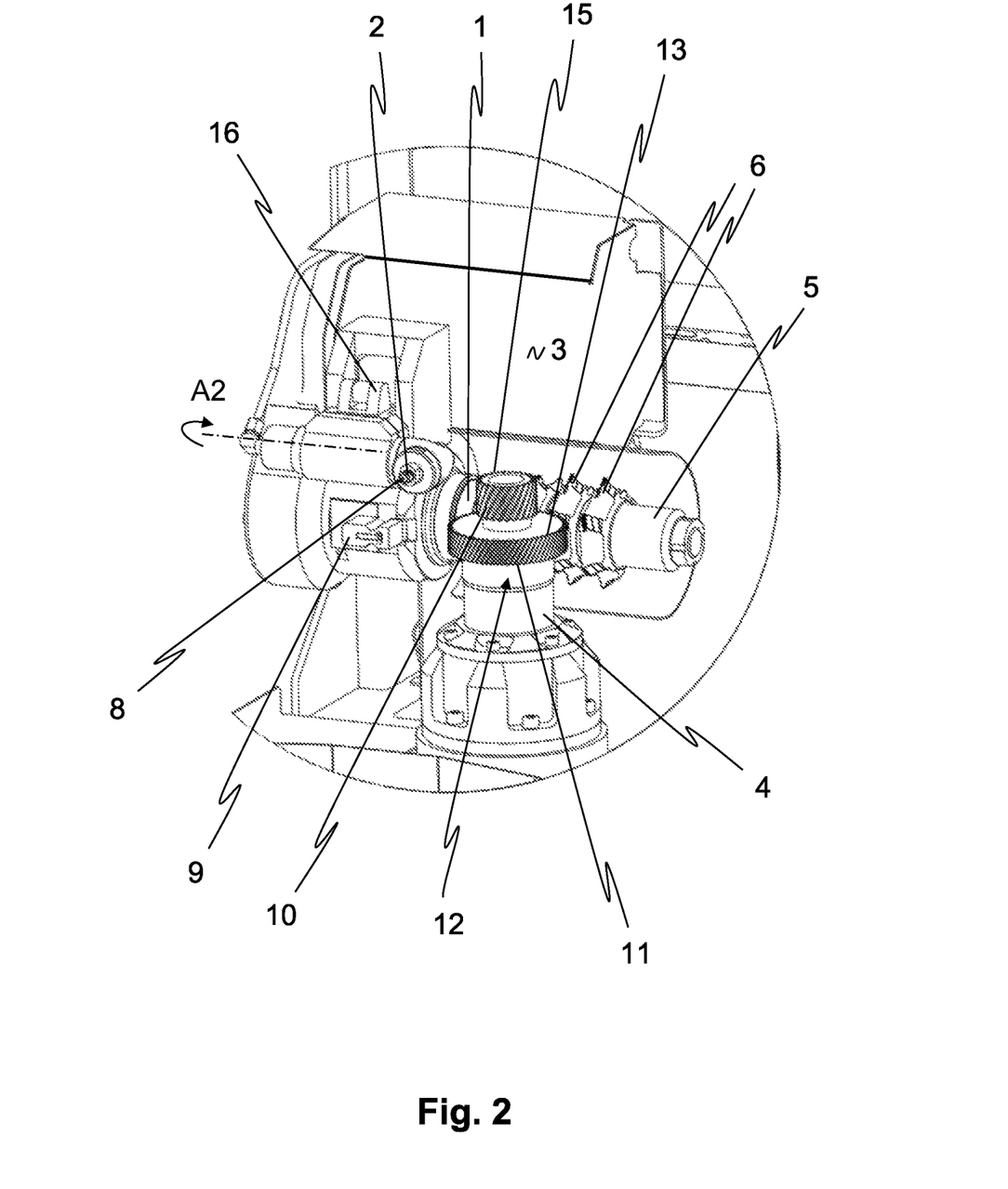
FIG. 2 shows an illustration of an enlarged section of the exemplary embodiment shown in FIG. 1.

FIGS. 1 and 2 are illustrations of an exemplary embodiment of an apparatus according to the present disclosure for chamfer-machining a workpiece.

The apparatus includes a workpiece spindle with a workpiece holder 4 that is rotatable about an axis of rotation C2. For chamfer-machining a workpiece 7 received in the workpiece holder a machining head 3 is provided, which is movable relative to the workpiece holder 4 via machine axes X, Z, V/Y and A. On the machining head 3 a first tool spindle with a tool holder 1 for receiving at least one first chamfer milling cutter 6 is provided. In the exemplary embodiment a plurality of chamfer milling cutters 6 are received in the first rotatably mounted tool holder 1 on a common tool mandrel 5. Via a drive of the first tool spindle the chamfer milling cutters 6 can be put into rotation about an axis of rotation B2.

In the exemplary embodiment, the tool holder 4 is arranged on a machine bed 10 and extends vertically. The machining head is arranged on a frame 11 in a suspended position via the axes of movement X, Z, A, V or alternatively Y. Other mechanical and kinematic configurations, however, are possible. For example, the tool holder 4 can be arranged on a machine table. The machining head can be arranged on a tool stand.

In the exemplary embodiment, the chamfer milling cutters 6 are so-called Chamfer Cut units. This is a disk-shaped deburring tool that has a plurality of cutting teeth and flutes on its circumference. The cutting teeth extend helically in circumferential direction. The Chamfer Cut unit is multi-threaded, wherein one tooth is provided per thread. The cutting edges formed on the front side of the teeth in the direction of rotation, however, are located on a common flight circle.

Such a Chamfer Cut unit allows a very efficient deburring of the tooth edges, as each of the cutting teeth of the Chamfer Cut unit chamfer-machines a complete tooth groove of the toothing. For this purpose, the Chamfer Cut unit first is advanced into a suitable position relative to the tooth edge via the axes of movement of the machining head. Then, the first tool holder and the workpiece holder are synchronously put into rotation so that successive cutting teeth of the Chamfer Cut unit each chamfer-machine successive tooth grooves of the toothing.

The Chamfer Cut method, however, has the disadvantage that in the region beside the edge to be machined relatively much space is required for the Chamfer Cut unit. Therefore, when disturbing contours, for example in the form of a further toothing, are present beside the edge to be machined, the edge cannot be machined by the Chamfer Cut method.

To be able to also chamfer-machine such edges, a second tool spindle with a tool holder 2 for receiving an end milling cutter 8 is provided on the machining head 3 according to the present disclosure.

The chamfer-machining of a second edge of the workpiece by the end milling cutter is effected in that the same is traversed along the second tooth edge to be machined by the axes of movement of the machining head 3 and a rotation of the workpiece about the axis of rotation C2. The end milling cutter 8 is put into rotation about an axis of rotation B3 by a corresponding drive of the second tool spindle, which preferably is effected pneumatically.

In an exemplary embodiment, the machining head has an axis of movement X that is designed as a linear axis and is perpendicular to the axis of rotation C2 of the workpiece holder 4 and to the axis of rotation B2 of the first tool holder 1. This axis of movement X allows to adjust the axial distance between the workpiece holder 4 and the first tool holder 1. Furthermore, a second linear axis Z is provided, via which the machining head 3 is traversable parallel to the axis of rotation C2 of the workpiece holder 4. This allows traversing of the first chamfer milling cutters received in the first tool holder 1 along the tooth width to the corresponding tooth edge.

One or both of these axes of movement X and Z now can be used to guide the end milling cutter 8 along the tooth edge, while at the same time the workpiece is rotated about the axis of rotation C2. For each tooth of the toothing a traversing movement of the X-axis and/or the Z-axis following the contour of the tooth now is performed, by which the end milling cutter follows the contour of the edge of the tooth guided past the same due to the rotary movement of the workpiece and produces a chamfer at the same.

The machining head furthermore has a V-axis by which it can be traversed parallel to the axis of rotation B2 of the first tool holder. Thereby, that Chamfer Cut unit which is to be used for machining the respective edge on the one hand can be brought in engagement with the same. On the other hand, this axis also allows traversing of the end milling cutter into the position of engagement with the edge. Alternatively or in addition, there might be used a Y-axis by which the machining head can be traversed in a direction perpendicular to the X-axis and to the Y-axis. In this case, a superimposed movement of the Y-axis and the Z-axis is used for traversing the machining head parallel to the axis of rotation B2 of the first tool holder when the axis of rotation B2 is not arranged parallel to the Y-axis.

Furthermore, the machining head has a pivot axis A that extends perpendicularly to the axis of rotation C2 of the workpiece holder and to the axis of rotation B2 of the first tool holder and/or parallel to the X-axis. The axial angle between the workpiece and the chamfer milling cutters received in the first tool holder thereby can be adjusted.

The V-axis (or Y-axis) and the A-axis merely serve to adjust the relative position between the respective tool and the tooth edge before carrying out the actual chamfer-machining operation. The X-axis and/or the Z-axis on the other hand are dynamically adjusted during the chamfer-machining of a second tooth edge effected by the end milling cutter in order to vary the relative position between the workpiece and the end milling cutter and thereby traverse the end milling cutter along the tooth edge to be machined. While chamfer-machining a first edge by the first chamfer milling cutter the X-axis and the Z-axis on the other hand likewise merely serve to adjust the relative position between workpiece and tool, while the relative movement solely is effected by the synchronous rotation of workpiece and tool.

The axes of movement via which the machining head is traversable relative to the workpiece holder preferably are NC axes. Furthermore, the axis of rotation of the workpiece spindle and the axis of rotation of the first tool spindle preferably are also designed as an NC axis. The axis of rotation of the second tool spindle on the other hand is not designed as an NC axis, as the rotary movement of the end milling cutter need not be synchronized with other movements. In the exemplary embodiment, the second tool spindle therefore substantially is an angle grinder that is arranged on the machining head via a pivot axis A2.

The present disclosure can be used in particular for machining workpieces 7 as they are shown in FIGS. 1 to 9, and which have (at least) two toothings 7a and 7b. The configuration of the workpiece with two toothings 7a and 7b, which is clearly shown in particular in FIG. 3, leads to the fact that three of the total of four edges to be machined of the two toothings are easily accessible and therefore can be chamfer-machined by a first chamfer milling cutter, in particular a Chamfer Cut unit. In the exemplary embodiment, these are the lower edge 12 and the upper edge 13 of the first toothing 7a of larger diameter as well as the upper edge 15 of the second toothing 7b of smaller diameter. The lower, inner or second edge 14 of the second toothing 7b of smaller diameter on the other hand cannot be machined by the Chamfer cut method, as the first toothing 7a here forms a disturbing edge.

Figure 3:
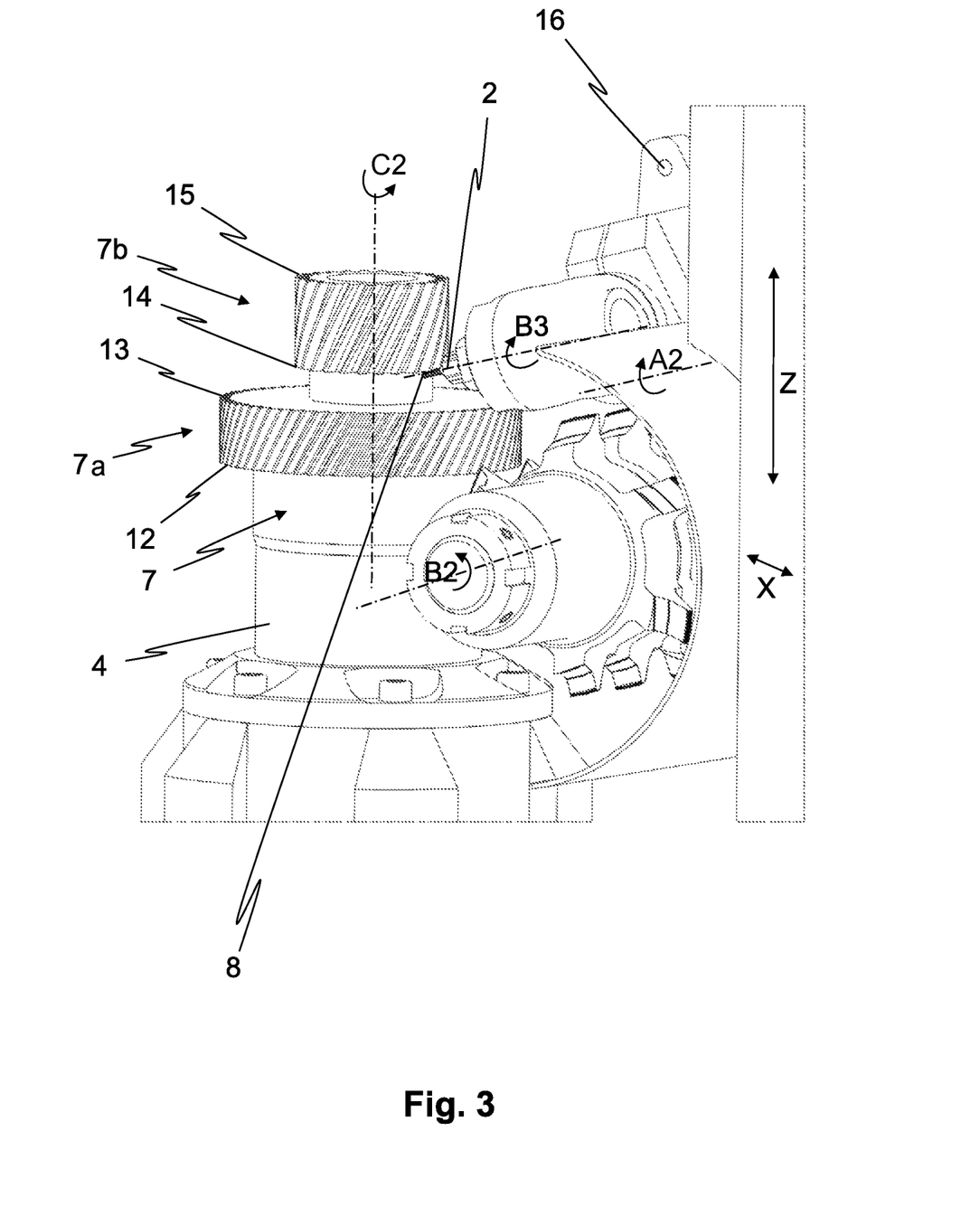
FIG. 3 shows an illustration of the chamfer-machining of a second edge by an end milling cutter received in the second tool holder according to the present disclosure.

As shown in FIG. 3, this second edge 14 therefore is chamfered in the sense of the present disclosure by an end milling cutter 8 received in the second tool holder 2. Machining is effected as it has already been set forth above. The axis of rotation B3 of the chamfer milling cutter preferably has an angle to a plane perpendicular to the axis of rotation C2 of the workpiece holder, which lies in a range between 10° and 40°, preferably in a range between 10° and 15°. The second workpiece spindle with the second tool holder for the end milling cutter therefor correspondingly is arranged or can be arranged on the machining head.

Figure 4:
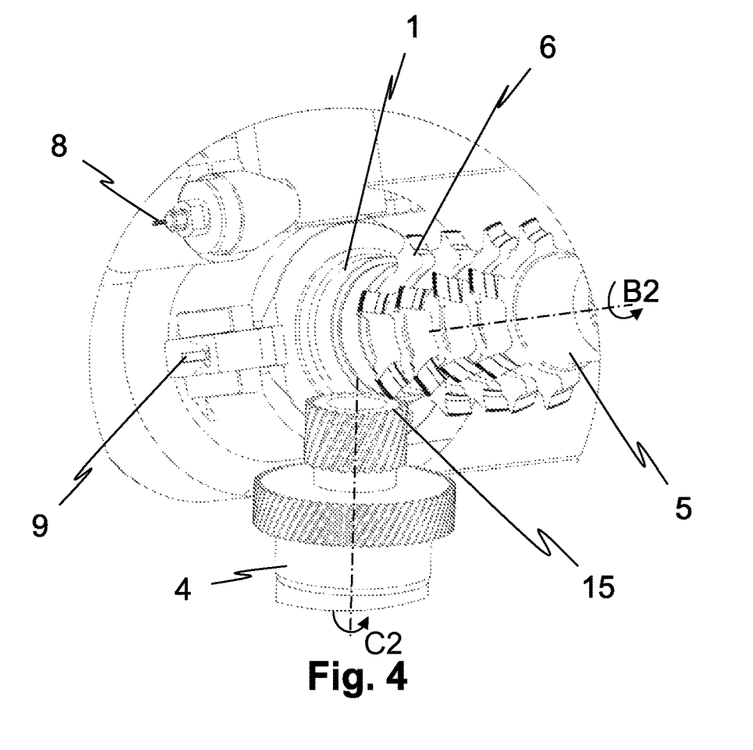
FIG. 4 shows an illustration of the chamfer-machining of a first edge by a chamfer milling cutter received in the first tool holder according to the present disclosure.
Figure 5:
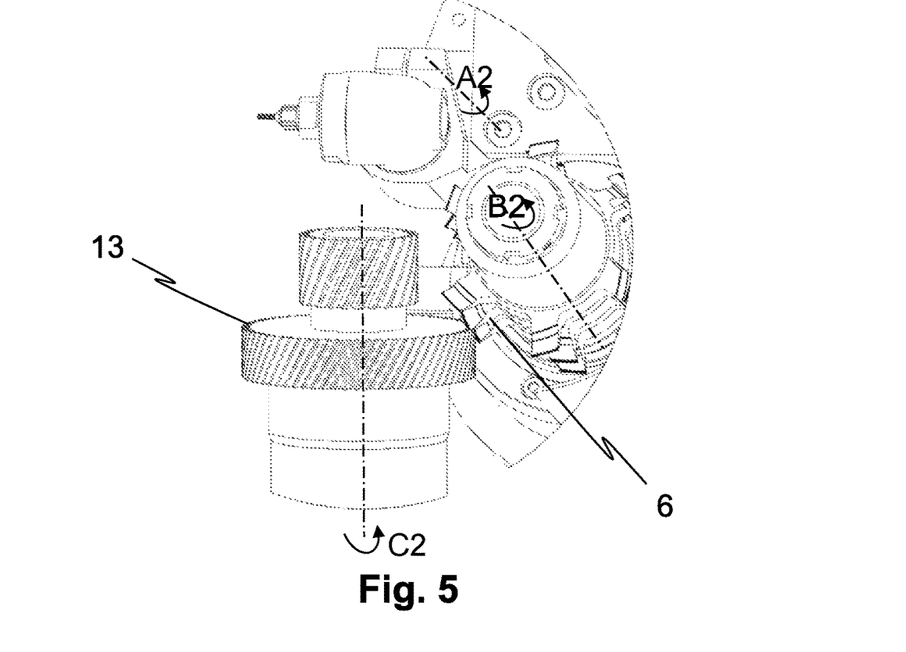
FIG. 5 shows an illustration of the chamfer-machining of another first edge by another chamfer milling cutter received in the first tool holder according to the present disclosure.
Figure 6:
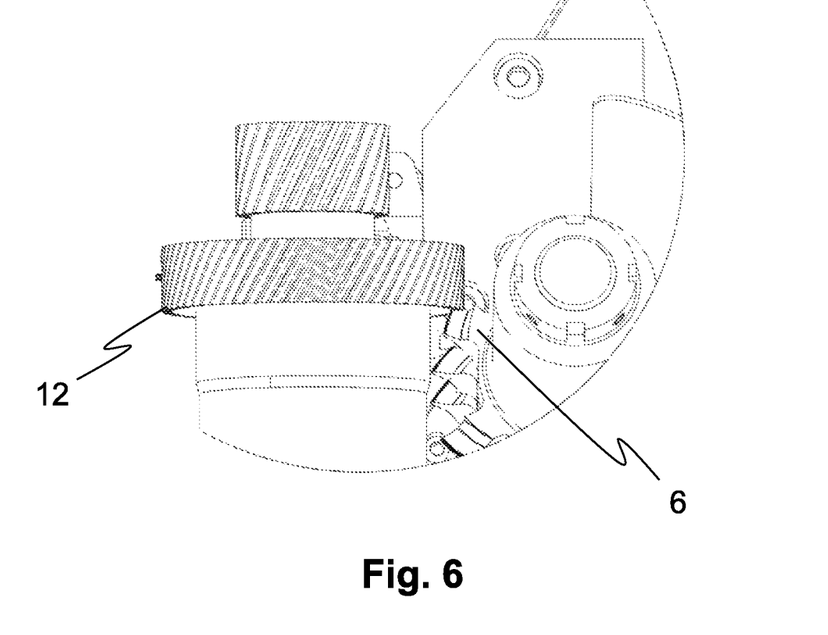
FIG. 6 shows an illustration of the chamfer-machining of another first edge by another chamfer milling cutter received in the first tool holder according to the present disclosure.

As shown in FIGS. 4 to 6, the chamfer-machining of the edges 12, 13 and 15, the first edges in the sense of the present disclosure, on the other hand is effected by the chamfer milling cutters 6 received in the first tool holder 1. As the same must specifically be adapted to the shape of the respective edges, a plurality of first chamfer milling cutters 6 are provided in the first tool holder 1 so that for machining each of the edges 12, 13 and 15 a separate first chamfer milling cutter 6 is available. The chamfer milling operation by the first chamfer milling cutter 6 each is effected as already set forth above by a synchronous rotation of the axes of rotation C2 of the workpiece holder and B2 of the first tool holder.

Figure 7:
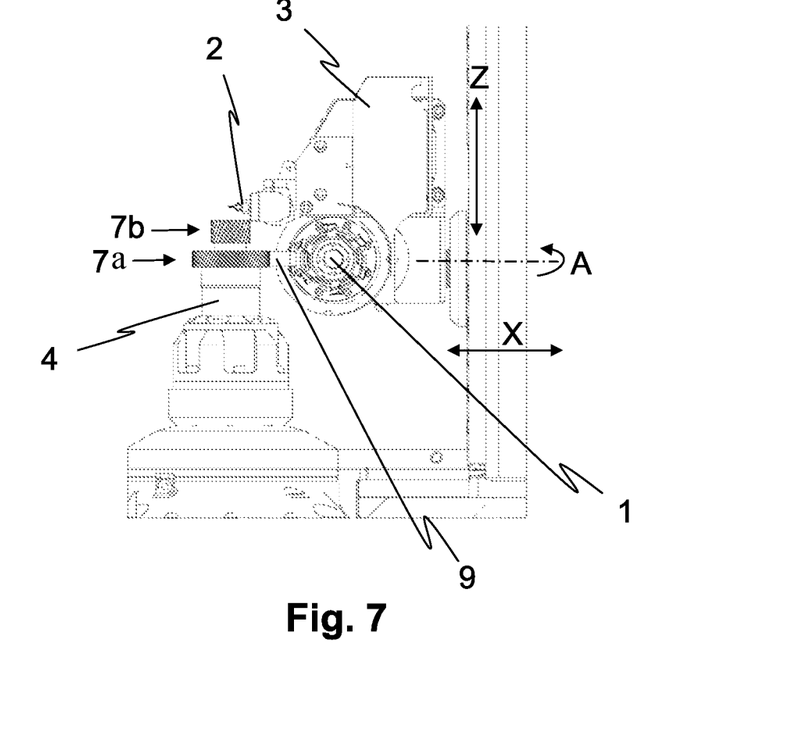
FIG. 7 shows an illustration of the use of a threading sensor for preparing the chamfer-machining of a first toothing of the workpiece.
Figure 8:
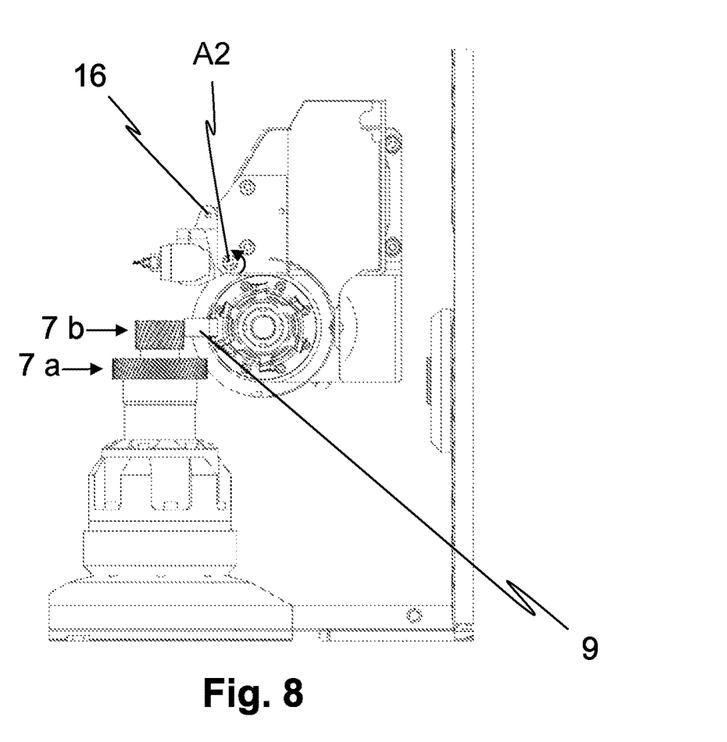
FIG. 8 shows an illustration of the use of the threading sensor for preparing the chamfer-machining of a second toothing of the workpiece.

As the apparatus according to the present disclosure merely serves for chamfer-machining and not for producing the toothing, the position of the respective toothing 7a and 7b after clamping a workpiece in the workpiece holder 4 usually is still unknown. On the machining head 3 a threading sensor 9 therefore is provided, via which the position of the teeth of the respective toothings 7a and 7b is detected. FIG. 7 shows the detection of the position of the teeth of the first toothing 7a, and FIG. 8 shows the detection of the teeth of the second toothing 7b. The threading sensor 9 therefor is each advanced to the toothing by the axes of movement of the machining head, and preferably the toothing is moved past the sensor by rotating the workpiece holder. The detection may be effected in a contactless way, in the exemplary embodiment via an inductive sensor.

The position information on the position of the teeth of the toothings obtained by the threading sensor then is used both for positioning the first chamfer milling cutter relative to the first edges and for positioning the end milling cutter 8 relative to the second edge.

Figure 9:
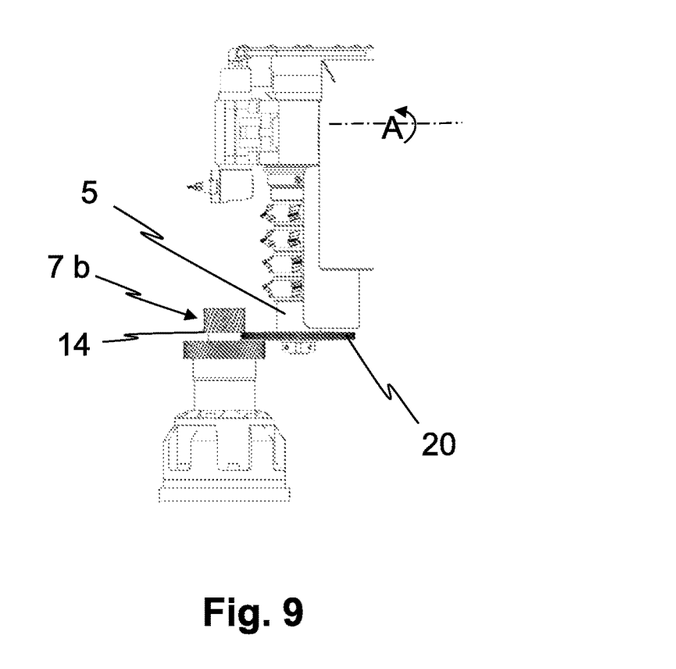
FIG. 9 shows an illustration of the brush-machining operation of the second edge chamfered by the end milling cutter by means of a brush received in the first tool holder.

FIG. 9 shows a variant of the present disclosure in which a brush 20 is provided on the tool mandrel 5 of the first tool holder. As end milling can produce secondary burrs, the burs are removed in this variant by using the brush 20 after chamfer-machining the second edge by the end milling cutter. The machining head therefor is pivoted over the A-axis into a position in which the axis of rotation of the first tool holder extends substantially parallel to the axis of rotation of the workpiece holder, and the brush is placed against the inner front side of the second toothing 7b or the second edge 14. The first edges in principle might likewise be brushed by the brush, but due to the high quality of the edges in a Chamfer Cut chamfer-machining operation this is usually not necessary.

Figure 10A:
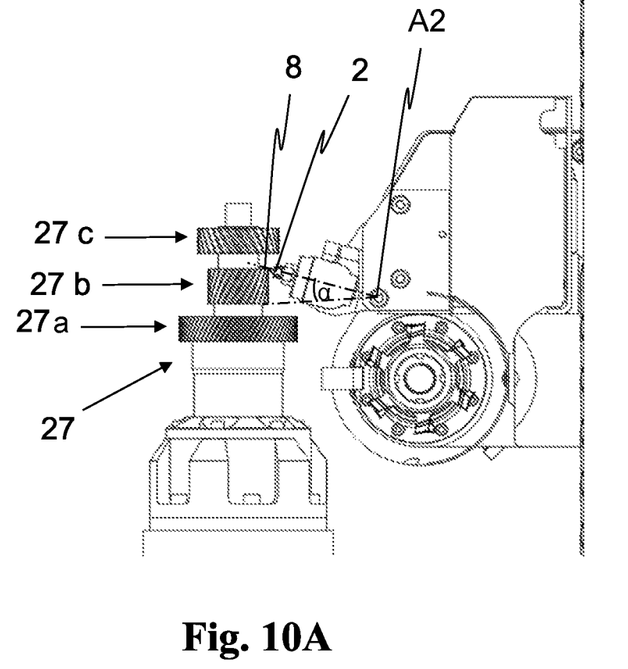
FIGS. 10A and 10B show an illustration of the chamfer-machining operation by an end milling cutter at a lower and an upper edge of an inner toothing of a workpiece with three toothings.
Figure 10B:
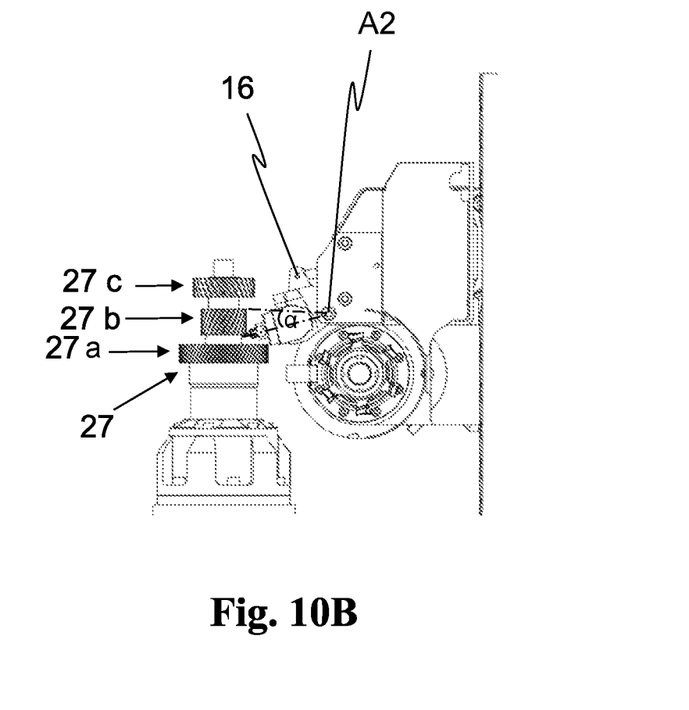

FIGS. 10A and 10B show another example of a workpiece 27 that can be chamfer-machined according to the present disclosure. The workpiece has three toothings 27a to 27c. The edges of the two outer toothings 27a and 27c can each be machined by first chamfer milling cutters, as the outer toothings 27a and 27c have a larger diameter than the inner toothing 27b. On the other hand, neither the upper nor the lower edge of the inner toothing 27b can be chamfer-machined by a first chamfer milling cutter, as the respective outer toothings form disturbing edges. These two second edges in the sense of the present disclosure therefore are chamfer-machined by an end milling cutter 8 received in the second tool holder, as shown in FIGS. 10A and 10B.

For machining the upper and the lower edge of the inner toothing 27b, different machining positions of the end milling cutter relative to the workpiece and in particular a reverse orientation of the end milling cutter with respect to the respective front side of the workpiece each may be necessary.

Therefore, the second tool spindle with the second tool holder 2 is arranged on the machining head via a pivot axis A2. In the exemplary embodiment, however, the pivot axis A2 is not an NC axis, but a pure adjustment axis by means of which the second tool holder can be pivoted from the first machining position shown in FIG. 10a for machining the upper edge of the toothing 27b into the second machining position for machining the lower edge, which is shown in FIG. 10B.

In the exemplary embodiment, a pneumatic cylinder therefor acts at position 16, via which the pivoting movement is effected between the first and the second machining position. A manual adjustment or the use of another drive likewise is conceivable.

The two machining positions each are defined by stops against which the second tool holder rests in the respective position. In some aspects, the two stops are adjustable in order to be able to adjust the angle α of the pivot axis A2 of the second tool holder relative to a plane that is perpendicular to the axis of rotation of the workpiece holder in a certain range. In one embodiment, the angle α is adjustable in a range between at least 10° and 55°.

The end milling cutter according to the present disclosure can also be used for chamfering toothings of shafts in which the tooth base substantially corresponds to the radius of the shaft and therefore have no or only a very small tooth edge in this area. As the end milling cutter is guided along the tooth edge under NC control, while the workpiece is rotated, for example only the tooth heads and the tooth flanks can be deburred here for example by omitting the tooth base.

Furthermore, it is conceivable for example to employ the circumference of the end milling cutter in the region of the flanks of the head, whereas in the region of the tooth base a rounded head of the end milling cutter is used so that here a correspondingly narrower chamfer is obtained.

The chamfer-machining apparatus according to the present disclosure can be designed either in a first variant as a stand-alone solution and correspondingly be connected to an automation that supplies and discharges workpieces to and from the apparatus.

In some embodiments, the apparatus according to the present disclosure is used in a machining center at cycle times parallel to a tooth-machining station. The tooth-machining station for example can be a milling machining station, an impact machining station or a gear skiving machining station. With regard to the disturbing contours, impact machining stations and/or gear skiving machining stations preferably are used.

Figure 11:
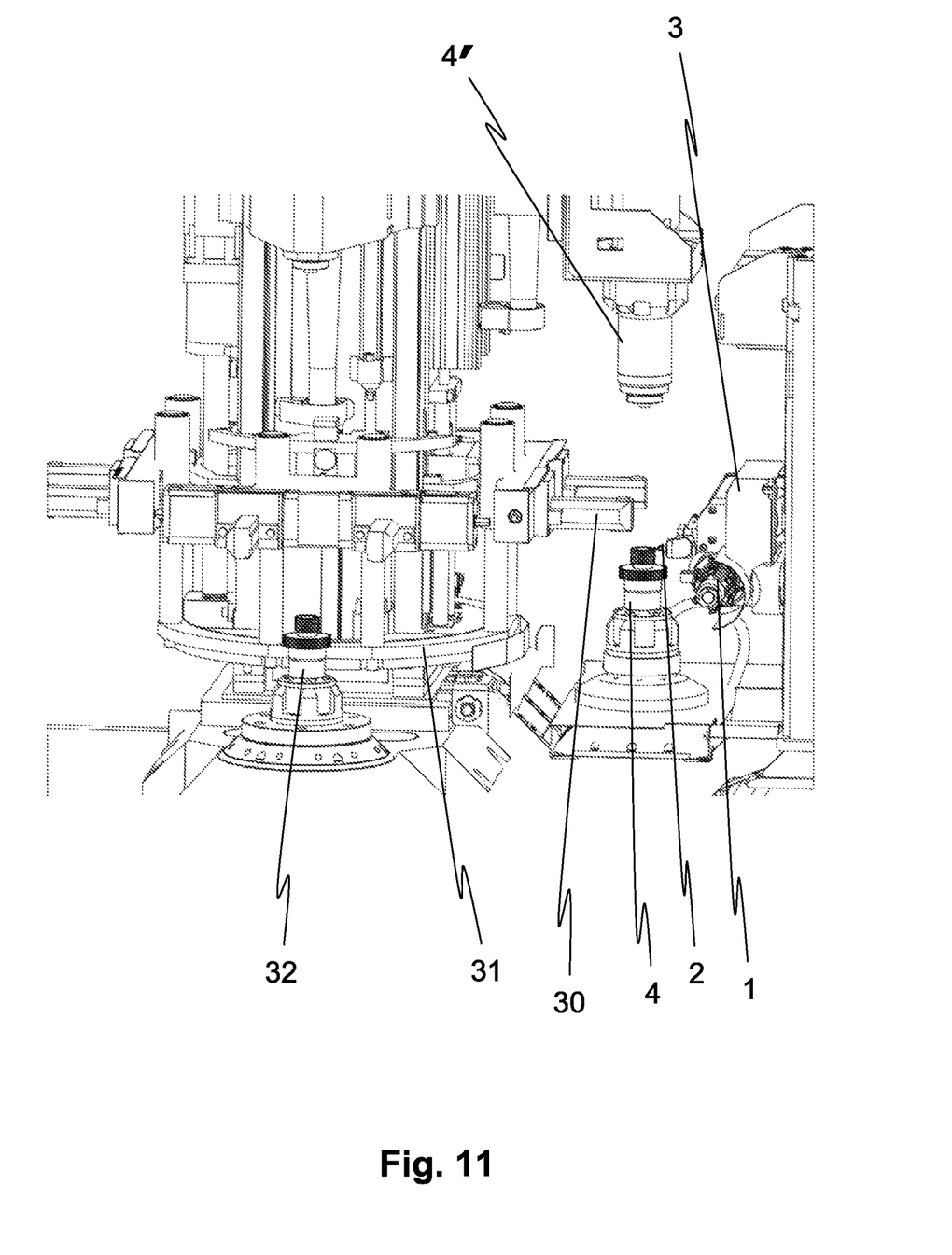
FIG. 11 shows an illustration of the use of an apparatus according to the present disclosure for chamfer-machining a workpiece in a machining center according to the present disclosure comprising a workpiece changer and a ring loader.

Such an incorporation of the apparatus according to the present disclosure into a machining center is shown in FIG. 11. The machining center includes a ring loader 31 with a gripper 30 via which the workpieces can be moved from one station to the next. On the right, the apparatus according to the present disclosure comprising the workpiece holder 4 and the machining head 3 with the first tool holder 1 and the second tool holder 2 is shown. Furthermore, a counter bearing 4' for the workpiece holder 4 can also be seen.

The workpiece holder 32 of the tooth-machining station is shown offset by 90°. The machining head of the tooth-machining machine on the other hand is not shown.

While the production of the toothing or one of the toothings of a workpiece is effected at the tooth-machining station, deburring of the produced toothings of another workpiece can be effected on the apparatus according to the present disclosure at parallel cycle times.

The apparatus according to the present disclosure and the machining center include a controller by which all of the described processes are carried out automatically. The control methods and routines disclosed herein may be stored as executable instructions in non-transitory memory and may be carried out by the control system including the controller in combination with the various sensors, actuators, and other machining hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the control system/controller, where the described actions are carried out by executing the instructions in a system including the various machining components including actuators and sensors in combination with the electronic controller.

Instead of the Chamfer Cut unit used in the exemplary embodiment, gear skiving tools might also be used as first chamfer milling cutters in order to machine the first edges of the toothing. The described chamfering method would also be carried out in the same way with a gear skiving tool as it has been described above for the use of Chamfer Cut units.

The apparatus according to the present disclosure and the method according to the present disclosure have been described with reference to exemplary embodiments that are provided for machining workpieces with an external toothing. The present disclosure, however, can also be used in the same way for workpieces with an internal toothing. In this case, the machining head must be designed such that the first chamfer milling cutter and preferably also the end milling cutter can be traversed into the interior of the toothing.

The invention claimed is:

1. A method for chamfer-machining at least two edges of a toothed workpiece, by means of an apparatus comprising at least one rotatably mounted workpiece holder for receiving the workpiece and a machining head movable relative to the workpiece holder via at least one axis of movement, wherein the machining head comprises at least one first rotatably mounted tool holder, wherein a first edge of a toothing of the workpiece received in the workpiece holder is chamfer-machined via a chamfer milling cutter received in the first rotatably mounted tool holder, wherein the machining head further comprises a second rotatably mounted tool holder, and a chamfer-machining of a second edge of the toothing of the workpiece received in the workpiece holder is effected via an end milling cutter received in the second tool holder;
wherein the chamfer milling cutter is a disk shaped tool having cutting teeth on a circumferential surface thereof and being mounted on a rotatable mandrel.

2. The method according to claim 1, comprising: driving the workpiece holder and the first rotatably mounted tool holder in a synchronized way for chamfering the first edge of the toothing, wherein the workpiece holder and the first rotatably mounted tool holder are driven by generating coupling.

3. The method according to claim 1, wherein the at least one axis of movement is a numerical control (NC) axis, the method comprising actuating the NC axis for the chamfer-machining of the second edge by a controller of the apparatus such that the end milling cutter received in the second tool holder is guided along the contour of the second edge to be machined, while the workpiece received in the rotatably mounted workpiece holder rotates about a rotatably mounted workpiece holder's axis of rotation.

4. The method according to claim 1, wherein the at least one axis of movement is at least one first linear axis X, via which the machining head is traversable in a direction perpendicular to an axis of rotation of the rotatably mounted workpiece holder and perpendicular to an axis of rotation of the first rotatably mounted tool holder, and/or at least one second linear axis Z, via which the machining head is traversable in a direction parallel to the axis of rotation of the rotatably mounted workpiece holder, and/or wherein the machining head is pivotable about a pivot axis A that extends perpendicularly to the axis of rotation of the rotatably mounted workpiece holder and perpendicularly to the axis of rotation of the first rotatably mounted tool holder, and/or wherein the machining head is traversable via a third linear axis Y or V, which extends in a plane that is perpendicular to the first linear axis X.

5. The method according to claim 1, wherein a threading sensor is arranged on the machining head, the method comprising: using the threading sensor both for positioning the chamfer milling cutter relative to the first edge for the chamfer-machining of the first edge and for positioning the end milling cutter relative to the second edge for the chamfer-machining of the second edge, wherein the threading sensor is a contactless threading sensor.

6. The method according to claim 1, wherein the second rotatably mounted tool holder is arranged on the machining head via a pivot axis, the method comprising: pivoting the second rotatably mounded tool holder from a first machining position for machining a lower edge into a second machining position for machining an upper edge.

7. The method according to claim 1, wherein an axis of rotation of the second rotatably mounted tool holder is aligned and/or can be aligned with a plane that extends perpendicularly to the axis of rotation of the workpiece holder at an angle that lies in a range between +/−45° and +/−30°.

8. The method according to claim 1, wherein the second rotatably mounted tool holder is rigidly arranged on the machining head or only via one or more adjustment axes, the method comprising: using an adjusting arrangement for adjusting an angular position of an axis of rotation of the second tool holder relative to the machining head for adjusting a chamfering angle.

9. The method according to claim 1, comprising: mounting a plurality of first chamfer milling cutters that includes the chamfer milling cutter jointly on a mandrel on the first rotatably mounted tool holder and chamfer-machining a plurality of first edges that includes the first edge of the toothing of the workpiece by the plurality of first chamfer milling cutters.

10. The method according to claim 1, comprising: mounting a brush together with the chamfer milling cutter on a mandrel on the first rotatably mounted tool holder, and deburring an edge chamfer-machined by the chamfer milling cutter or the end milling cutter by the brush.

11. The method according to claim 1, comprising: producing a chamfer only in partial areas of the second edge and/or machining of different partial areas of the second edge with different areas of the end milling cutter.

12. The method according to claim 1, comprising: actuating axes of the apparatus for automatically chamfering the edges of the toothing of the toothed workpiece.

13. The method according to claim 1, further comprising chamfer-machining a further workpiece comprising a plurality of toothings.

14. The method according to claim 13, comprising: chamfer-machining at least two of the first edges of the plurality of toothings by one or more first chamfer milling cutters received in the first rotatably mounted tool holder and chamfer-machining at least one of the second edges of the plurality of toothings by the end milling cutter received in the second tool holder.

15. The method according to claim 6, wherein the pivot axis is an adjustment axis and/or wherein adjustable stops are provided for adjusting the first and the second machining position.

16. The method according to claim 1, wherein the second rotatably mounted tool holder is arranged on the machining head via at least one numerical control (NC) axis, and/or wherein an axis of rotation of the second rotatably mounted tool holder is driven pneumatically, hydraulically and/or electrically.

17. The method according to claim 10, comprising: pivoting the machining head from a chamfer-machining position to a deburring position about a pivot axis A that extends perpendicularly to an axis of rotation of the workpiece holder and perpendicularly to an axis of rotation of the first rotatably mounted tool holder.

18. The method according to claim 1, wherein the end milling cutter comprises a cylindrical or conical shape.

19. The method according to claim 1, wherein the end milling cutter comprises a rounded head.

\* \* \* \* \*